US006444383B2

(12) United States Patent
Ikeuchi et al.

(10) Patent No.: US 6,444,383 B2
(45) Date of Patent: Sep. 3, 2002

(54) IMAGE RECEIVING SHEET AND METHOD OF FORMING OHP IMAGE

(75) Inventors: Nobuho Ikeuchi; Masafumi Hayashi, both of Tokyo-to (JP)

(73) Assignee: Dai Nippon Printing Co., Ltd., Tokyo-To (JP)

( * ) Notice: Subject to any disclaimer, the term of this patent is extended or adjusted under 35 U.S.C. 154(b) by 22 days.

(21) Appl. No.: 09/770,321

(22) Filed: Jan. 26, 2001

(30) Foreign Application Priority Data

Jan. 28, 2000 (JP) ....................................... 2000-020446
Feb. 2, 2000 (JP) ....................................... 2000-024980

(51) Int. Cl.[7] ........................... G03G 13/20; B32B 5/16

(52) U.S. Cl. ............................. 430/42; 430/18; 430/45; 430/47; 428/480; 428/483

(58) Field of Search .............................. 430/18, 42, 45, 430/47; 428/480, 483

(56) References Cited

U.S. PATENT DOCUMENTS 6,063,538 A * 5/2000 Hayashi et al. ............. 430/124

* cited by examiner

*Primary Examiner*—Mark Chapman
(74) *Attorney, Agent, or Firm*—Timothy J. Keefer; Wildman, Harrold, Allen & Dixon

(57) ABSTRACT

The present invention provides an image receiving sheet applicable to an over head projector (OHP) and a process for forming an OHP image. The image receiving sheet is capable of forming a yellow image providing a parallel-ray transmittance (Y) of 50% or more when the transmittance density (X) is in a range from 0 to 1.0 by electrophotography. The image receiving sheet is capable of forming a yellow image providing a haze value (Z) of 40% or less when the transmittance density (X) is in a range from 0 to 1.0 by electrophotography.

16 Claims, 5 Drawing Sheets

IMAGE RECEIVING SHEET AND METHOD OF FORMING OHP IMAGE

CROSS REFERENCE TO RELATED APPLICATION

This application claims the priority of Japanese patent application Ser. No. 2000-020446 filed on Jan. 28, 2000 and 2000-024980 filed on Feb. 2, 2000.

BACKGROUND OF THE INVENTION

1. Field of the Invention

The present invention relates to an image receiving sheet used for recording an image formed by electrophotography, and, particularly, to an electrophotographic OHP image receiving sheet capable of restraining a projected image from being grayed when a color image is projected using an OHP.

2. Description of the Related Art

In recent years, a method of forming a full color image by mixing either three toners having different colors, specifically, yellow, magenta and cyan or four toners having different colors, specifically, black in addition to the above three colors by using electrophotography has been put to practical use.

An image receiving sheet used in this electrophotography generally adopts a structure in which a receptor layer is formed on a substrate to record and maintain record information such as characters and images exactly. This image receiving sheet is used for OHPs (overhead projector) as communicating means used in lectures, schools, industries, and other explanatory meetings and exhibitions.

When a color image formed by electrophotography is projected by an OHP, such a phenomenon that the projected image is grayed (exhibits a gray tone) and the range of the reproduction of a tone is narrowed is observed. This is because a toner stuck to the smooth image receiving surface of an image receiving sheet is insufficiently embedded so that the surface is not smoothed and the toner is swollen granularly and incident light is thereby scattered during the projection of an OHP whereby a shadow is formed on a screen.

As a method used to solve the grayness problem, there is disclosed a method measuring and defining the molten toner inclination angle of the receptor surface of an image receiving sheet with a toner at a fixing temperature of the toner, which is described in, for example, JP-A No. 5-88400 or JP-A No. 5-197184. In a method of measuring the molten toner inclination angle, unlike the fixing condition in an actual recording printer, a toner disk is formed as a sample and an image receiving sheet and the disk are placed on a hot plate to measure the molten toner inclination angle by using an appointed measuring meter. In this method, specific instruments such as a molding member and a hot plate are required and it is necessary to take care for the aforementioned measurement. This method is not practically convenient because of, for example, dispersion of measured values.

SUMMARY OF THE INVENTION

Accordingly, it is an object of the present invention to find an electrophotographic OHP image receiving sheet which has high tone reproducibility, enables a vivid image and produces no graying phenomenon in a projected image of OHPs by a simple measuring method, thereby solving the aforementioned problem.

According to a first aspect of the present invention, there is provided an image receiving sheet printable by electrophotography and applicable to an overhead projector (OHP), the image receiving sheet being capable of forming a yellow image providing a parallel-ray transmittance of 50 % or more when the transmittance density is in a range from 0 to 1.0 by electrophotography.

The image receiving sheet is preferably capable of forming a yellow image providing a parallel-ray transmittance of 55 % or more when the transmittance density is in a range from 0 to 0.6 by electrophotography.

In the first aspect of the present invention, there is also provided an image receiving sheet printable by electrophotography and applicable to an overhead projector (OHP), wherein the following expression 1 is established between the transmittance density and the parallel-ray transmittance when the transmittance density is in a range from 0 to 0.6; Expression 1

$$Y \geqq \{34/(X+1.2)\}+57$$

where X represents the transmittance density and Y represents the parallel-ray transmittance, provided that $0 \leqq X \leqq 0.6$.

In one embodiment of these OHP image receiving sheets, a receptor layer printable by electrophotography is formed on at least one side of a substrate film.

In the first aspect of the present invention, there is also provided an image forming process capable of projecting an image by an OHP using any one of the aforementioned image receiving sheets.

Specifically, the process of forming an OHP image according to the first aspect has the characteristics that any one of the aforementioned image receiving sheets is provided, and an image is printed on the image receiving sheet by electrophotography.

According to the above first aspect of the present invention, the image receiving sheet is simply evaluated on the basis of the parallel-ray transmittance (JIS K 7105) and transmittance density (Macbeth TR-924, filter: status A blue (ISO 5-3)) of a sheet on which an image is formed, thereby obtaining an image receiving sheet which has high tone reproducibility, enables a high vivid image and produces no graying phenomenon in an projected image of an OHP with no complicated method.

According to a second aspect of the present invention, there is provided an image receiving sheet printable by electrophotography and applicable to an overhead projector (OHP), the image receiving sheet being capable of forming a yellow image providing a haze value of 40 % or less when the transmittance density is in a range from 0 to 1.0 by electrophotography.

The image receiving sheet is preferably capable of forming a yellow image providing a haze value of 30 % or less when the transmittance density is in a range from 0 to 0.6 by electrophotography.

In the second aspect of the present invention, there is also provided an image receiving sheet printable by electrophotography and applicable to an overhead projector (OHP), wherein the following expression 3 is established between the transmittance density and the haze value when the transmittance density is in a range from 0 to 0.6; Expression 3

$$Z \leqq 32-17/(7X+0.6)$$

where X represents the transmittance density and Z represents the haze value, provided that $0 \leqq X \leqq 0.6$.

In one embodiment of these OHP image receiving sheets, a receptor layer printable by electrophotography is formed on at least one side of a substrate film.

In the second aspect of the present invention, there is also provided an image forming process capable of projecting an image by an OHP using any one of the aforementioned image receiving sheets. Specifically, the process of forming an OHP image according to the second aspect has the characteristics that any one of the aforementioned image receiving sheets is provided, and an image is printed on the image receiving sheet by electrophotography.

According to the above second aspect of the present invention, the image receiving sheet is simply evaluated on the basis of the haze value (using a haze meter manufactured by Nippon Denshoku Kogyo according to JIS K 7105) and transmittance density (Macbeth TR-924, filter: status A blue (ISO 5-3)) of a sheet on which an image is formed, thereby obtaining an image receiving sheet which has high tone reproducibility, enables a high vivid image and produces no graying phenomenon in an projected image of an OHP with no complicated method.

DESCRIPTION OF THE PREFERRED EMBODIMENT

Next, the present invention will be explained in more detail by way of embodiments of an electrophotographic OHP image receiving sheet. It is to be noted that the image receiving sheet according to the present invention includes all image receiving sheets used for transferring and recording a visible image formed by developing an electrostatic image by using a toner and is not limited to an image receiving sheet for recording an electrophotograph.

An embodiment of the present invention will be explained based on the drawings.

Figure 1:
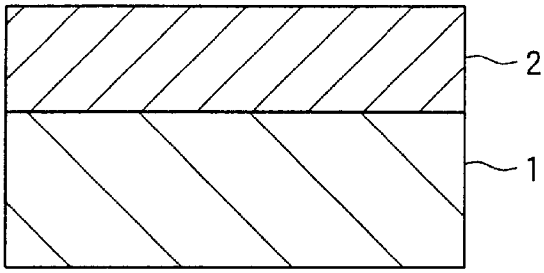
FIG. 1 is a vertical section showing one embodiment of an image receiving sheet of the present invention.

FIG. 1 is a vertical section showing one embodiment of an image receiving sheet of the present invention. In this image receiving sheet, a receptor layer 2 is formed on one surface of a substrate film 1.

Figure 2:
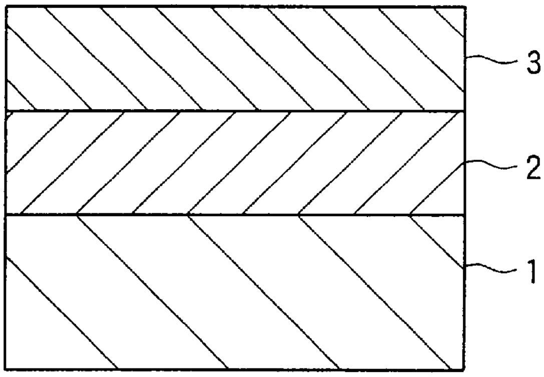
FIG. 2 is a vertical section showing another embodiment of an image receiving sheet of the present invention.
Figure 3:
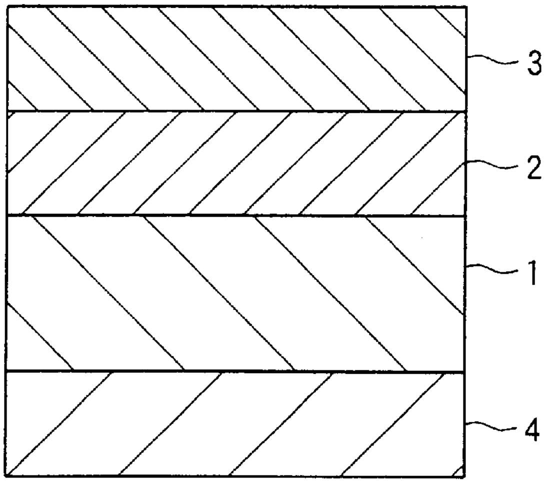
FIG. 3 is a vertical section showing a further embodiment of an image receiving sheet of the present invention.

FIG. 2 and FIG. 3 are vertical sections showing further embodiments of an image receiving sheet of the present invention. In the embodiment of FIG. 2, a receptor layer 2 is formed on one surface of a substrate film 1 and a resistance control layer 3 is formed on the receptor layer 2.

In the embodiment of FIG. 3, a receptor layer 2 is formed on one surface of a substrate film 1, a resistance control layer 3 is formed on the receptor layer 2 and a resistance control layer 4 is formed on the other surface of the substrate film 1.

Also, in the image receiving sheet of the present invention, a receptor layer may be formed on one surface of a substrate film and, as required, a resistance control layer may be formed as the outermost layer of an image receiving surface and/or back surface and a primer layer may be formed between the receptor layer and the substrate film and further, a back surface layer may be formed on the other surface of the substrate film.

The structure of each section of the electrophotographic OHP image receiving sheet will be hereinafter explained in order.

(Substrate Film)

As the substrate film 1 used in the image receiving sheet of the present invention, a type made of a thermoplastic resin provided with transparency, heat resistance, dimensional stability and rigidity is preferable since the image receiving sheet is used for an OHP sheet or the like to observe a recorded image by using a transmitting light. Specifically, a film or sheet made of a polyethylene terephthalate resin, polycarbonate resin, acrylic resin, polyvinyl chloride resin, polypropylene resin, polystyrene resin, polyethylene resin, cellulose diacetate resin or cellulose triacetate resin in a thickness of about 10 to 250 $\mu$m and preferably about 50 to 150 $\mu$m is exemplified. Among these resins, a polyethylene terephthalate resin, polyvinyl chloride resin, polypropylene resin or cellulose triacetate resin is more preferable in view of the above performances.

Since the image receiving sheet of the present invention is used for an OHP sheet or the like to observe a recorded image by using a transmitting light, it is desirable that the parallel-ray transmittance of the whole structure including the substrate film and the receptor layer and, further, the resistance control layer, the primer layer, the back surface layer and the like as required be 70% or more. If this requirement is fulfilled, an excellent transmitted image can be obtained.

It is to be noted that known adhesive treatment such as primer treatment or corona discharge treatment may be performed on the surface of the substrate film for the purpose of improving adhesion to a layer formed on the substrate film.

(Image Receiving Surface and Receptor Layer)

The electrophotographic OHP image receiving sheet of the present invention is used to form an image on the surface of the substrate film itself or on the surface of the receptor layer by using electrophotography or similar techniques.

A receptor layer 2 may be formed on at least one surface of the substrate film to improve the ability to fix a toner to the image receiving surface. In the present invention, as to a yellow image, a fixed relationship as described later must be established between the transmittance density and the parallel-ray transmittance or between the transmittance density and the haze value. Even in the case where the substrate film has toner-fixing ability, a receptor layer may be formed to control the transmittance density, the parallel-ray transmittance and the haze value. A resin having toner-fixing ability and high wettability to a color toner is used to form a receptor layer.

In a first aspect of the present invention, the parallel-ray transmittance of a yellow image portion when the transmittance density of the yellow image formed by electrophotography is in a range from 0 to 1.0 is 50% or more. Or the parallel-ray transmittance of the yellow image portion is 55% or more when the transmittance density is in a range from 0 to 0.6. Alternatively, the parallel-ray transmittance is in the range defined by the following expression 1 when the transmittance density is in a range from 0 to 0.6 whereby a vivid image having high tone reproducibility is obtained and an OHP image freed of a graying phenomenon is obtained.

Expression 1

$$Y \geqq \{34/(X+1.2)\}+57$$

where X represents the transmittance density and Y represents the parallel-ray transmittance, provided that $0 \leqq X \leqq 0.6$.

Figure 4:
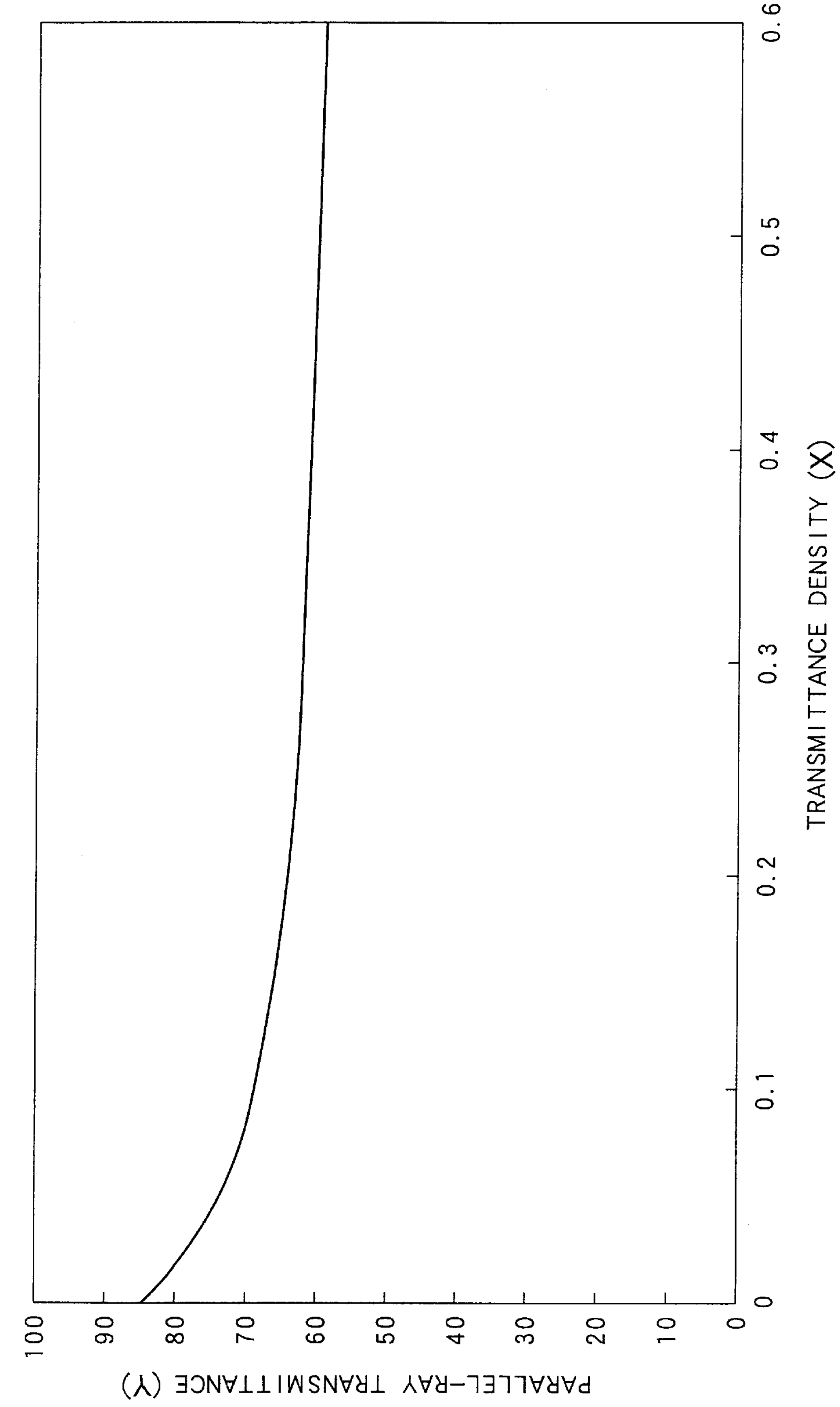
FIG. 4 is a graph of the relational formula: $Y \geqq \{34/(X+1.2)\}+57$ when the transmittance density is in a range from 0 to 0.6 with respect to the parallel-ray transmittance of a yellow image formed by electrophotography where X represents the transmittance density and Y represents the parallel-ray transmittance.

When the abscissa is X and the ordinate is Y and Y is dotted according to the relation of the formula Y=[34/(X+1.2)]+57, the relation is shown by the solid curve in the graph of FIG. 4. Therefore, the range defined by the expression 1 is the zone above and including the solid curve.

When the receptor layer is formed on the substrate film in the image receiving sheet of the present invention, whether a graying phenomenon is produced or not in the image projected by an OHP can be determined in a simple manner by measuring the parallel-ray transmittance in the condition that a yellow image is formed on the receptor layer by electrophotography and by confirming whether the above requirement is satisfied or not. Namely, even if there is no OHP projector, whether a graying phenomenon is produced or not can be determined by only measuring the above parallel-ray transmittance in an image to be projected by the OHP.

In the present invention, the values of the parallel-ray transmittance are those measured by a method prescribed in JIS K 7105 and the values of the transmittance density are those measured by using a Macbeth TR-924, status A blue filter (ISO 5-3).

If the parallel-ray transmittance of the yellow image portion when the transmittance density is in a range from 0 to 1.0 is less than 50%, the tone reproducibility is inferior and the vividness of an image is deteriorated with the result that a graying phenomenon is produced in the projected image of an OBP.

Also, even if the parallel-ray transmittance of the yellow image portion when the transmittance density of the yellow image formed by electrophotography is in a range from 0 to 0.6 is less than 55%, the tone reproducibility is inferior and the vividness of an image is deteriorated with the result that a graying phenomenon is produced in the projected image of an OHP like the above case.

Also, if the parallel-ray transmittance of the yellow image portion when the transmittance density of the yellow image formed by electrophotography is in a range defined by the following expression 2 when the transmittance density is in a range from 0 to 0.6, the tone reproducibility is inferior and the vividness of an image is deteriorated with the result that a graying phenomenon is produced in the projected image of an OHP.

Expression 2

$$Y<\{34/(X+1.2)\}+57$$

where X represents the transmittance density and Y represents the parallel-ray transmittance, provided that $0 \leqq X \leqq 0.6$.

In a second aspect of the present invention, the haze value when the transmittance density of a yellow image formed by electrophotography is in a range from 0 to 1.0 is 40% or less. Or the haze value of the yellow image portion is 30% or less when the transmittance density is in a range from 0 to 0.6. Alternatively, the haze value is in the range defined by the following expression 3 when the transmittance density is in a range from 0 to 0.6 whereby a vivid image having high tone reproducibility is obtained and an OHP image freed of a graying phenomenon is obtained.

Expression 3

$$Z \leqq 32-17/(7X+0.6)$$

where X represents the transmittance density and Z represents the haze value, provided that $0 \leqq X \leqq 0.6$.

Figure 5:
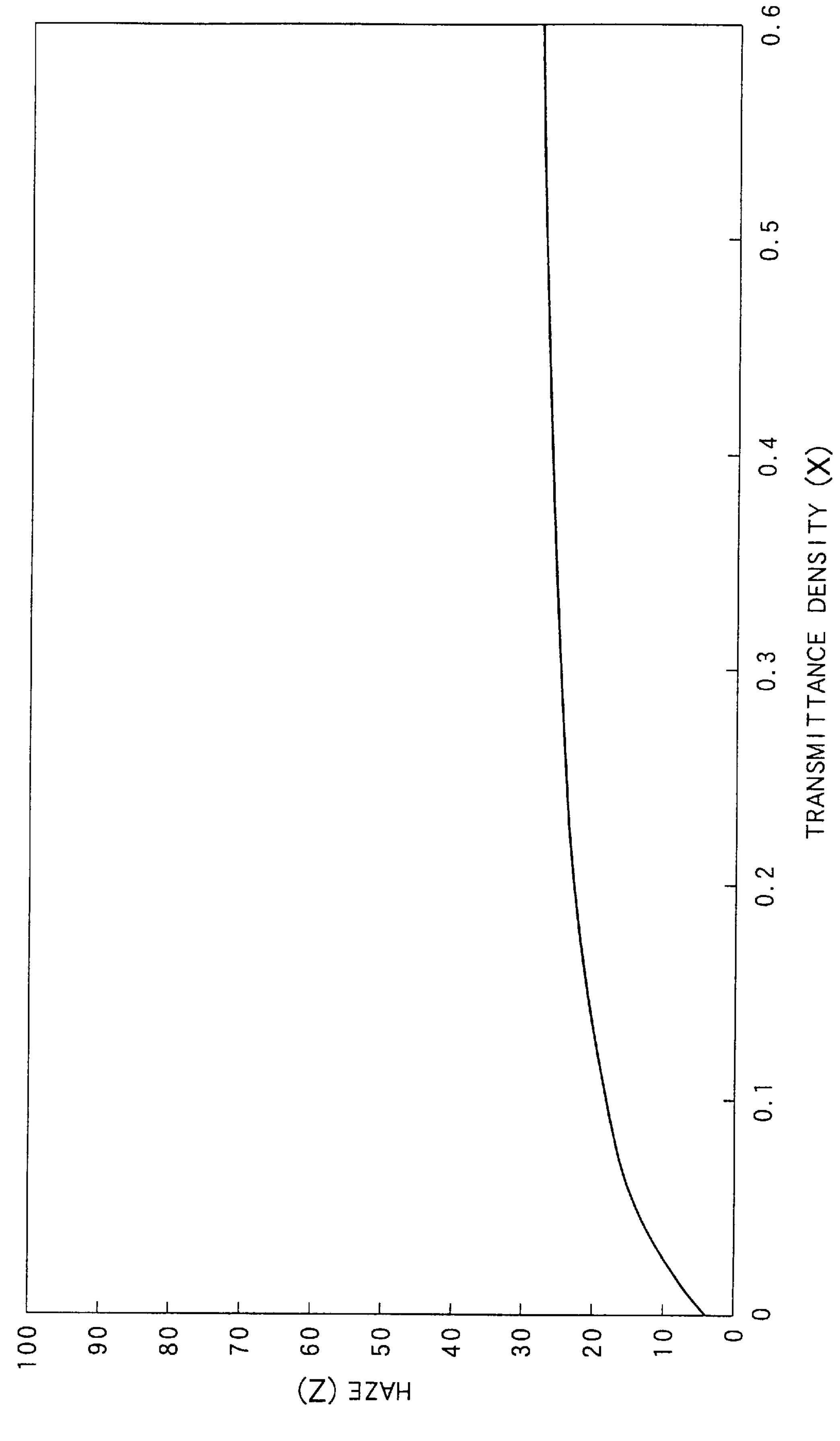
FIG. 5 is a graph of the relational formula: $Z \leqq 32-17/(7X+0.6)$ when the transmittance density is in a range from 0 to 0.6 with respect to the haze value of a yellow image formed by electrophotography where X represents the transmittance density and Z represents the haze value.

When the abscissa is X and the ordinate is z and z is dotted according to the relation of the formula Z=32−17/(7X+0.6), the relation is shown by the solid curve in the graph of FIG. 5. Therefore, the range defined by the expression 3 is the zone below and including the solid curve.

When the receptor layer is formed on the substrate film in the image receiving sheet of the present invention, whether a graying phenomenon is produced or not in the image projected by an OHP can be determined in a simple manner by measuring the haze value and the transmittance density in the condition that a yellow image is formed on the receptor layer by electrophotography and by confirming whether the above requirement is satisfied or not. Namely, even if there is no OHP projector, whether a graying phenomenon is produced or not can be determined by only measuring the above haze value in an image to be projected by an OHP.

In the present invention, the values of the haze value are those measured by using a haze meter manufactured by Nippon Denshoku Kogyo according to a method prescribed in JIS K 7105 and the values of the transmittance density are those measured by using a Macbeth TR-924, status A blue filter (ISO 5-3).

If the haze value of the yellow image portion when the transmittance density is in a range from 0 to 1.0 exceeds 40%, the tone reproducibility is inferior and the vividness of an image is deteriorated with the result that a graying phenomenon is produced in the projected image of an OHP.

Also, even if the haze value of the yellow image portion when the transmittance density is in a range from 0 to 0.6 exceeds 30%, the tone reproducibility is inferior and the vividness of an image is deteriorated with the result that a graying phenomenon is produced in the projected image of an OHP like the above case.

Also, if the haze value of the yellow image portion when the transmittance density is in a range defined by the following expression 4 when the transmittance density is in a range from 0 to 0.6, the tone reproducibility is inferior and the vividness of an image is deteriorated with the result that a graying phenomenon is produced in the projected image of an OHP.

Expression 4

$$Z>32-17/(7X+0.6)$$

where X represents the transmittance density and Z represents the haze value, provided that $0 \leqq X \leqq 0.6$.

In order to allow the parallel-ray transmittance or haze value of a yellow image formed by electrophotography to fall in the range defined in the present invention, examples of the resin forming the receptor layer include polyolefin resins such as a polyethylene and polypropylene; vinyl resins such as a polyvinyl chloride, polyvinylidene chloride, polyvinyl acetate, vinyl chloride/vinyl acetate copolymer, polyacrylate and polystyrene; polyester obtained by condensation-polymerizing a diol having a bisphenol skeleton or an alkylene skeleton with a divalent or trivalent carboxylic acid or its modification; polyamide type resin; copolymer of a polyolefin such as polyethylene or polypropylene and other vinyl monomer; ionomer; cellulose type resin such as ethyl cellulose and cellulose acetate; polycarbonate resin; epoxy resin; and phenoxy resin.

As these binder resins for the receptor layer, those having a softening point of 30° C. or more and 200° C. or less are preferably used. Binder resins having a softening point less than 30° C. are undesirable in view of preservation ability. Specifically, when image receiving sheets are stuck on each other, the so-called blocking phenomenon that the receptor layer adheres to the contact surface tends to be produced. On the other hand, if the softening point exceeds 200° C., this requires large energy when an image is formed (fixed) and is therefore undesirable.

Because a polyester resin having a bisphenol A skeleton is frequently used as a binding resin for a toner in general, particularly a polyester resin or its modified product is preferably used for the binder of the receptor layer in view of compatibility, fixing ability and the like.

A polyester resin to be used in the receptor layer may be prepared by condensation-polymerizing divalent alcohol components with dicarboxylic acids. Examples of a divalent alcohol component include a diol component of bisphenol A modified using ethylene glycol or propylene glycol. Examples of a divalent alcohol component further include ethylene glycol, neopentyl glycol, propylene glycol and trimethylene glycol. Examples of a dicarboxylic acid include an aromatic dicarboxylic acid such as terephthalic acid, isophthalic acid and phthalic acid and an aliphatic dicarboxylic acid such as adipic acid, oxalic acid, succinic acid, fumaric acid, maleic acid, sebacic acid and moronic acid.

Polyester resins exemplified above preferably have a number average molecular weight ranging from 1,500 to 7,000 regardless of the type of structural component. When the molecular weight is excessively small, the resin is too soft, so that when the image receiving sheets are stuck on each other, the receptor layer adheres to the contact surface and tends to cause blocking. On the other hand, when the molecular weight is excessively large, the resin is too hard as the binder resin of the receptor layer and hence it is decreased in compatibility with a toner, so that the toner stuck to the image receiving surface is embedded insufficiently by heating during fixing and is swollen granularly and incident light is thereby scattered when an image is projected by an OHP whereby a shadow is formed on a screen, specifically, the so-called graying phenomenon of the projected image tends to occur in, particularly, a highlight section.

The binder resin of the receptor layer as aforementioned is highly compatible with a binder resin of a toner used for electrophotographic recording, has good toner-fixing ability and toner-wettability and brings about excellent image reproducibility. The binder resin can also control the relationship between the transmittance density and the parallel-ray transmittance or the relationship between the transmittance density and the haze value within a preferable range with respect to a yellow image.

Namely, the parallel-ray transmittance of a yellow image portion can be made to be 50% or more when the transmittance density of the yellow image formed by electrophotography is in a range from 0 to 0.1, also can be made to be 55% or more when the transmittance density is in a range from 0 to 0.6, and further can be made to fall in a range defined by the aforementioned expression 1 when the transmittance density is in a range from 0 to 0.6.

Alternatively, the haze value of a yellow image portion can be made to be 40% or less when the transmittance density of the yellow image formed by electrophotography is in a range from 0 to 0.1, also can be made to be 30% or less when the transmittance density is in a range from 0 to 0.6, and further can be made to fall in a range defined by the aforementioned expression 3 when the transmittance density is in a range from 0 to 0.6.

Either one or both of an organic filler and an inorganic filler may be contained in the receptor layer, to the extent that it has not much effect of decreasing the parallel-ray transmittance of the receptor layer or raising the haze value of the receptor layer, to improve the carriage characteristics. Given as examples of the organic filler are fine particles made of organic resins including fluororesins such as an ethylene tetrafluoride resin and ethylene/ethylene tetrafluoride copolymer, polyethylene resins, polystyrene resins, acrylic resins, polyamide resins and benzoguanamine resins. On the other hand, given as examples of the inorganic filler are silica, colloidal silica, alumina, kaolin, clay, calcium carbonate, talc and titanium dioxide.

The average particle size of the filler to be contained is about 0.1 to 30 μm and preferably about 3 to 20 μm. When the average particle size is less than 0.1 μm, a desired effect is not obtained whereas when the average particle size exceeds 30 μm, this causes image fault and also causes a decreased transparent feeling when the resulting sheet is used for an OHP and is therefore undesirable. Also, the content of the filler is preferably in a range between 0.1 and 10% by weight based on the binder resin of the receptor layer. When the content is too large, the transparency is decreased whereas when the content is too small, a desired effect of improving carriage ability is not obtained.

In addition to the above filler, additives such as various surfactants, wax and oil may be mixed and used to the extent that the effect of the present invention is not impaired. The receptor layer is formed by applying a coating solution containing the aforementioned resin component, filler and, as required, other additives by using a known printing means such as gravure printing or silk screen printing or a known coating means such as gravure coating in a dry thickness of about 1 to 10 μm.

(Back Surface Layer)

The image receiving sheet of the present invention may be provided with a back surface layer containing a filler or Si groups on the other surface of the above substrate film according to the need. The image receiving sheet of the present invention may be provided with a back surface layer formed on the side provided with no receptor layer to more improve the carriage characteristics and to impart curling preventiveness to the receptor layer formed on the face side of the substrate film. Moreover, if the back surface layer is provided with the same image receiving capability as the receptor layer formed on the face side of the substrate film, an image can be formed irrespective of the surface or back surface, or on both surfaces of the image receiving sheet.

For the back surface layer, an acrylic resin, urethane type resin or thermoplastic resin to which a silicone group is added such as a silicone-modified acrylic resin, silicone-modified urethane type resin or silicone-modified polyester type resin may be used. Further, a graft copolymer having at least one releasable segment among a polysiloxane segment, carbon fluoride segment and long-chain alkyl segment on a principal chain of a binder resin made of an acryl type, vinyl type, polyester type, polyurethane type, polyamide type or cellulose type resin may be used as a thermoplastic resin.

The back surface layer is formed by adding the aforementioned resin and organic filler or inorganic filler and, as required, other additives and by applying these components by a known coating means in the same manner as in the preparation of the receptor layer. The thickness of the back surface layer is usually 0.01 to 1.0 μm in the dried state. Although a dry thickness of 0.01 to 1.0 μm produces a sufficient effect in many case, it is preferable to set the dry thickness in the range of about 0.1 to 2.0 μm in the case of controlling the surface electric resistance.

To state the filler for the back surface layer, examples of the organic filler include fillers made of organic resins including fluororesins such as an ethylene tetrafluoride resin and ethylene/ethylene tetrafluoride copolymer, polyethylene resins, polystyrene resins, acrylic resins, polyamide resins and benzoguanamine resins. On the other hand, as the inorganic filler, silica, colloidal silica, alumina, kaolin, clay, calcium carbonate, talc or titanium dioxide may be used.

(Resistance Control Layer)

The provision of a resistance control layer on the outermost position of the image receiving surface and/or the back surface or between the receptor layer and the substrate film and/or between the back surface layer and the substrate film ensures that the antistatic ability and the toner fixing ability can be well-maintained.

Given as examples of resistance control materials used in the resistance control layer are ionic conductive materials, metal fine particles and conductive polymers having a π electron conjugate double bond.

Examples of the ionic conductive material include positive ion, negative ion and amphoteric ion types, for example, cationic antistatic agents such as quaternary ammonium salts and polyamine derivatives, anionic type antistatic agents such as alkyl phosphates and nonionic antistatic agents such as fatty acid esters.

As examples of the metal fine particles, tin oxide ($SnO_2$), zinc oxide (ZnO), indium oxide ($In_2O_3$) and titanium oxide ($TiO_2$) may be given. These metal fine particles may be used either singly or in combinations of two or more. As such a metal fine particle, those having an average particle size ranging from 0.01 to 1.0 μm are preferable.

Also, a dopant may be added to the metal fine particle as aforementioned according to the need. As the dopant, generally, Sb (antimony) is used when the metal fine particle is $SnO_2$, Al (aluminum) is used when the metal fine particle is ZnO and Sn is used when the metal fine particle is $In_2O_3$. The aforementioned metal oxides may be either singly or in combinations of different types. Moreover, the above metal oxides may be coated with $SnO_2$ or $SnO_2$ doped with Sb.

Further, the metal fine particle as aforementioned may be a needle particle. In this case, a needle particle having a long axis with a length ranging from 0.1 to 2 μm and an aspect ratio ranging from 10 to 50 is preferable. The use of such a needle metal fine particle makes it possible to control the resistance even if the amount of the needle metal fine particle is smaller than that of a spherical particle. The transparency of a layer containing the metal fine particle is therefore improved and the quality of the transmitted image can be bettered when the image receiving sheet is used in applications such as OHPs which are used to observe the recorded image by using transmitting light.

For the image receiving sheet of the present invention, preferably used are $SnO_2$, metal oxide coated with $SnO_2$ or $SnO_2$ doped with Sb, in particular the $SnO_2$ doped with Sb, in consideration of the coating suitability of metal particles, stability in the surface electric resistance, the electric conduction of metal, cost or the like.

As to the composition of a coating solution for the layer containing the aforementioned metal fine particle, it is preferable to set the weight ratio in terms of the weight of the metal fine particle/the weight of the thermoplastic resin (binder) within the range of from 0.2 to 2.0. When the weight ratio of the metal fine particle/the thermoplastic resin is less than 0.2, the surface resistance of a layer to be formed is not stabilized because the amount of the metal fine particle is small. On the other hand, when the weight ratio of the metal fine particle/the thermoplastic resin exceeds 2.0, the peculiar color of the metal fine particle is noticeable, particularly in the case of tin oxide doped with antimony, which is undesirable. In the case of tin oxide doped with antimony, a bluish color appears from the surface conspicuously.

It is preferable that the above metal fine particle be subjected to hydrophilic treatment performed on the surface thereof and be dispersed in an aqueous solution of the binder resin by adding a surfactant or a known dispersant such as ethylene glycol.

Next, examples of the conductive polymer having a π electron conjugate double bond include a polythiophene, polyaniline, sulfonated polyaniline, polyacetylene doped chemically, polyparaphenylene, polyphenylenevinylene, polyparaphenylene sulfide, polypyrrole chemically polymerized and doped, heat-treated products produced from phenol resin, heat-treated product produced from polyamide and heat-treated products produced from perylenic acid anhydride.

As the above conductive polymer having a π electron conjugate double bond, a polyaniline or polythiophene doped with a sulfonic group is especially useful.

The above polythiophene has high transparency and is therefore utilized to produce an image receiving sheet for OHPs. In the case where the image receiving sheet according to the present invention must have transparency in particular, the transmittance of the image receiving sheet for rays can be increased to 70% or more.

Further, because such a polythiophene is a polymer and scarcely bled out from the layer unlike a conventional low molecular charge control agent, it does not almost cause a sticky feeling of the image receiving sheet, a reduction in the charge control ability during storage and contamination (set-off) of the toner image-receiving layer with the bled-out charge control agent.

The aforementioned polythiophene is dissolved or dispersed in water or a mixed solvent of water and a water-miscible organic solvent (e.g., methanol, ethanol or acetone) in the presence of a poly negative ion while partly carrying a positive charge. Therefore, a layer containing a polythiophene can be formed with ease by preparing a coating solution containing the polythiophene such as a coating solution for a charge control layer or a coating solution for an image receiving layer and by applying the coating solution on the substrate of the image receiving sheet.

As the supply source of the poly negative ion, for example, a polymer sulfonic acid such as a polystyrenesulfonic acid, polymer carboxylic acid such as a polyacrylic acid or polyphosphoric acid or alkali salts of them, especially those having a molecular weight of 2,000 to 500,000 may be used. A preferable poly negative ion is a polystyrenesulfonic acid. When a dispersion is prepared, it is preferable that the average particle size of a polythiophene in the dispersion be made to be 10 μm or less. As the solution or dispersion containing a polythiophene, commercial products are available. For example, a product (trademark: Baytron P) is available from Bayer.

Also, a sulfonated polyaniline is useful as other conductive polymer materials having a π electron conjugate structure. The sulfonated polyaniline is polyanilines doped with a sulfonic group. The sulfonated polyaniline can be obtained under the trademark of aqua Pass-01Z as an aqueous solution or a solution of a mixed solvent of water and an organic solvent from Nitto Chemical Industry and used in the present invention. These solutions are yellowish solutions. However, when the concentration is low, they are almost non-colored. Therefore, these solutions may be used without any problem though the image receiving sheet must have transparency when the image receiving sheet is used in applications such as OHPs which are used to observe the recorded image by using transmitting light.

The resistance control layer is formed by applying a coating solution containing a binder resin and a resistance control material as major components to the outermost position (the image receiving surface or the back surface) of the image receiving sheet or to beneath the receptor layer or the back surface layer by means of a common coating method using a gravure coater, roll coater or wire bar, followed by drying.

The amount to be applied is about 0.001 to 5 μm in terms of thickness after dried. If the amount is smaller than the above range, only insufficient charge control ability is obtained. On the other hand, even if the amount to be applied is larger than the above range, the above performance is not improved in proportion to the thickness in any sense and therefore such an amount is not only economically disadvantageous but also a cause of reduced density of an image formed in an electrophotographic copying machine or a printer. So, an amount out of the above range is undesirable.

It is preferable that the above resistance control layer be disposed on the outermost position of the image receiving surface and/or back surface of the image receiving sheet or between the image receiving layer and the substrate film and/or between the back surface layer and the substrate film and the content of the resistance control agent in the resistance control layer and the amount of the resistance control layer to be applied be controlled, thereby allowing the surface resistance to fall in a range between $1\times10^{8}$ to $1\times10^{14}$ Ω/□ under the circumstance of a temperature of 23±2° C. and a humidity of 50±10% in the condition that the resistance control layer forms the surface.

When the surface resistance is lower than $1\times10^{8}$ Ω/□, the transfer efficiency is reduced and the recording density tends to be decreased. When the surface resistance exceeds $1\times10^{14}$ Ω/□ on the contrary, a discharge phenomenon occurs when the image receiving sheet is separated from the light-sensitive body after a toner is transferred. For this phenomenon, the toner is scattered, for example, leading to the disorder of characters and an image. This causes reductions in image quality and vividness and also the occurrence of static electricity and inferior lubricity whereby carriage defects and adhesion of dusts tend to be caused.

(Primer Layer)

The image receiving sheet may be provided with a primer layer between the receptor layer and the substrate film. The primer layer improves adhesion between the substrate film and the image receiving layer, so that the receptor layer is never peeled from the substrate film, making it possible to prevent the off-set and the like between the receptor layer and a fixing roller. As the resin used for the primer layer, for example, an alkyd resin, polyester resin, polyvinyl acetate resin, vinyl chloride/vinyl acetate copolymer resin, NBR resin, SBR resin, polyurethane resin, acrylic resin or polyamide is used independently, or as mixtures, copolymer products or modified products of these resins. The modified products are those obtained by copolymerizing or grafting, for example a monomer containing a hydroxyl group, carboxylic acid or quaternary ammonium salt to improve adhesiveness and hydrophilic ability.

Also, each of these resins may be cross-linked using, for example, various hardeners such as an epoxy resin, melamine resin and isocyanate to improve the adhesiveness and film strength of the primer layer. As a method of forming the aforementioned primer layer, the same method as used to form the aforementioned receptor layer may be selected.

The thickness of the primer layer is preferably 0.01 to 10 μm and more preferably 0.05 to 1.0 μm when it is dried. If the thickness is too small, only insufficient adhesion is exhibited whereas if the thickness is too large, the end face of the image receiving sheet is made to be sticky when it is cut and the production cost is increased. Therefore, an amount out of the above range is undesirable.

EXAMPLES

The present invention will be explained in more detail by way of examples, in which all designations of parts and % indicate parts by weight and weight percentage (wt %), respectively, unless otherwise noted.

A series of Example A and a series of Example B are shown hereinbelow. The series of Example A are examples according to the first aspect of the present invention whereas the series of Example B are examples according to the second aspect of the present invention.

Series of Example A (Example A-1)

A receptor layer was formed on one surface of a substrate film shown below by using a coating solution a1 for a receptor layer which had the following composition and a resistance control layer was formed on the receptor layer by using the following coating solution for a resistance control layer to produce an image receiving sheet of Example A-1.

Also, the thickness (dry thickness) of the receptor layer was set to 2 μm and the thickness of the resistance control layer was regulated such that the surface resistance of the image receiving sheet became $1\times10^{10}$ Ω/□.

[Substrate Film]

Polyethylene terephthalate film 100 μm in thickness (100-T60, manufactured by Toray)

[Coating Solution a1 for Receptor Layer]

Polyester resin (Epicoat 1004, manufactured by Yuka Shell

| | |
|---|---|
| Epoxy, number average molecular weight: 1,600, softening point: 97° C., Tg: 55° C.) | 30 parts |

-continued

| | |
|---|---|
| Silica filler (average particle size: 5 $\mu$m) | 0.5 parts |
| Methyl ethyl ketone | 35 parts |
| Toluene | 35 parts |

[Coating Solution for Resistance Control Layer]

| | |
|---|---|
| Cation modified quaternary ammonium salt | 1 part |
| Isopropyl alcohol | 100 parts |

(Example A-2)

A receptor layer was formed on one surface of the substrate film used in Example A-1 by using the following coating solution a2 for a receptor layer and a resistance control layer was formed on the receptor layer by using the coating solution for a resistance control layer which was used in Example A-1 to produce an image receiving sheet of Example A-2.

Also, the thickness (dry thickness) of the receptor layer was set to 2 $\mu$m and the thickness of the resistance control layer was regulated such that the surface resistance of the image receiving sheet became $1\times10^{10}$ Ω/□.

[Coating Solution a2 for Receptor Layer]

| | |
|---|---|
| Polyester resin (RV220, manufactured by Toyobo, number average molecular weight: 4,000, Tg: 53° C.) | 30 parts |
| Silica filler (average particle size: 5 $\mu$m) | 0.5 parts |
| Methyl ethyl ketone | 35 parts |
| Toluene | 35 parts |

(Example A-3)

A receptor layer was formed on one surface of the substrate film used in Example A-1 by using the following coating solution a3 for a receptor layer and a resistance control layer was formed on the receptor layer by using the coating solution for a resistance control layer which was used in Example A-1 to produce an image receiving sheet of Example A-3.

Also, the thickness (dry thickness) of the receptor layer was set to 2 $\mu$m and the thickness of the resistance control layer was regulated such that the surface resistance of the image receiving sheet became $1\times10^{10}$ Ω/□.

[Coating Solution a3 for Receptor Layer]

| | |
|---|---|
| Polyester resin (HP320, manufactured by The Nippon Synthetic Chemical Industry, number average molecular weight: 3,300, softening point: 95° C., Tg: 63° C.) | 30 parts |
| Silica filler (average particle size: 5 $\mu$m) | 0.5 parts |
| Methyl ethyl ketone | 35 parts |
| Toluene | 35 parts |

(Comparative Example A-1)

A receptor layer was formed on one surface of the substrate film used in Example A-1 by using the following coating solution a4 for a receptor layer and a resistance control layer was formed on the receptor layer by using the coating solution for a resistance control layer which was used in Example A-1 to produce an image receiving sheet of Comparative Example A-1.

Also, the thickness (dry thickness) of the receptor layer was set to 2 $\mu$m and the thickness of the resistance control layer was regulated such that the surface resistance of the image receiving sheet became $1\times10^{10}$ Ω/□.

[Coating Solution a4 for Receptor Layer]

| | |
|---|---|
| Polyester resin (HP313, manufactured by The Nippon Synthetic Chemical Industry, number average molecular weight: 8,000, softening point: 110° C., Tg: 64° C.) | 30 parts |
| Silica filler (average particle size: 5 $\mu$m) | 0.5 parts |
| Methyl ethyl ketone | 35 parts |
| Toluene | 35 parts |

(Comparative Example A-2)

A receptor layer was formed on one surface of the substrate film used in Example A-1 by using the following coating solution a5 for a receptor layer and a resistance control layer was formed on the receptor layer by using the coating solution for a resistance control layer which was used in Example A-1 to produce an image receiving sheet of Comparative Example A-2.

Also, the thickness (dry thickness) of the receptor layer was set to 2 $\mu$m and the thickness of the resistance control layer was regulated such that the surface resistance of the image receiving sheet became $1\times10^{10}$ Ω/□.

[Coating Solution a5 for Receptor Layer]

| | |
|---|---|
| Polyester resin (RV200, manufactured by Toyobo, number average molecular weight: 17,000, softening point: 163° C., Tg: 53° C.) | 30 parts |
| Silica filler (average particle size: 5 $\mu$m) | 0.5 parts |
| Methyl ethyl ketone | 35 parts |
| Toluene | 35 parts |

Using the image receiving sheets prepared in the above Examples and Comparative Examples, the parallel-ray transmittance and transmittance density of a yellow image formed by electrophotography were measured and also the image quality was evaluated.

In a method of forming a yellow image, an image produced using 256 gradations at the following ratio: R=225, G=225 and B=X ($0\leqq X\leqq 225$), was used in a color LBP (laser printer) and a yellow gradation pattern portion presented in the Test Chart No. 5-1 of Electrophotographic Association was used in a color PPC (plain paper copier).

In a method of measuring the surface resistance of each of image receiving sheets prepared in Examples and Comparative Examples, a voltage of 500 V was applied to the surface of each image receiving sheet under a circumstance of 23° C. and 50% RH and the surface resistance was measured by using a surface resistance measuring meter (Hiesta, manufactured by Mitsubishi Petrochemical) at 10 seconds after starting of the voltage-application.

[Parallel-ray Transmittance and Transmittance Density]

A self-made electrophotographic type printer (softening point of a toner to be used: 100° C., surface temperature of a fixing roll: 180° C.) was used to make a record in the image receiving surface of each image receiving sheet obtained in Examples and Comparative Examples in a manner that a test pattern of only a yellow image was obtained. The recorded printed product was measured for the parallel-ray transmittance according to a method prescribed in JIS K 7105 and for the transmittance density by using the status A blue filter prescribed in ISO 5-3 and a transmittance densitometer TR-924 manufactured by Macbeth.

Figure 6:
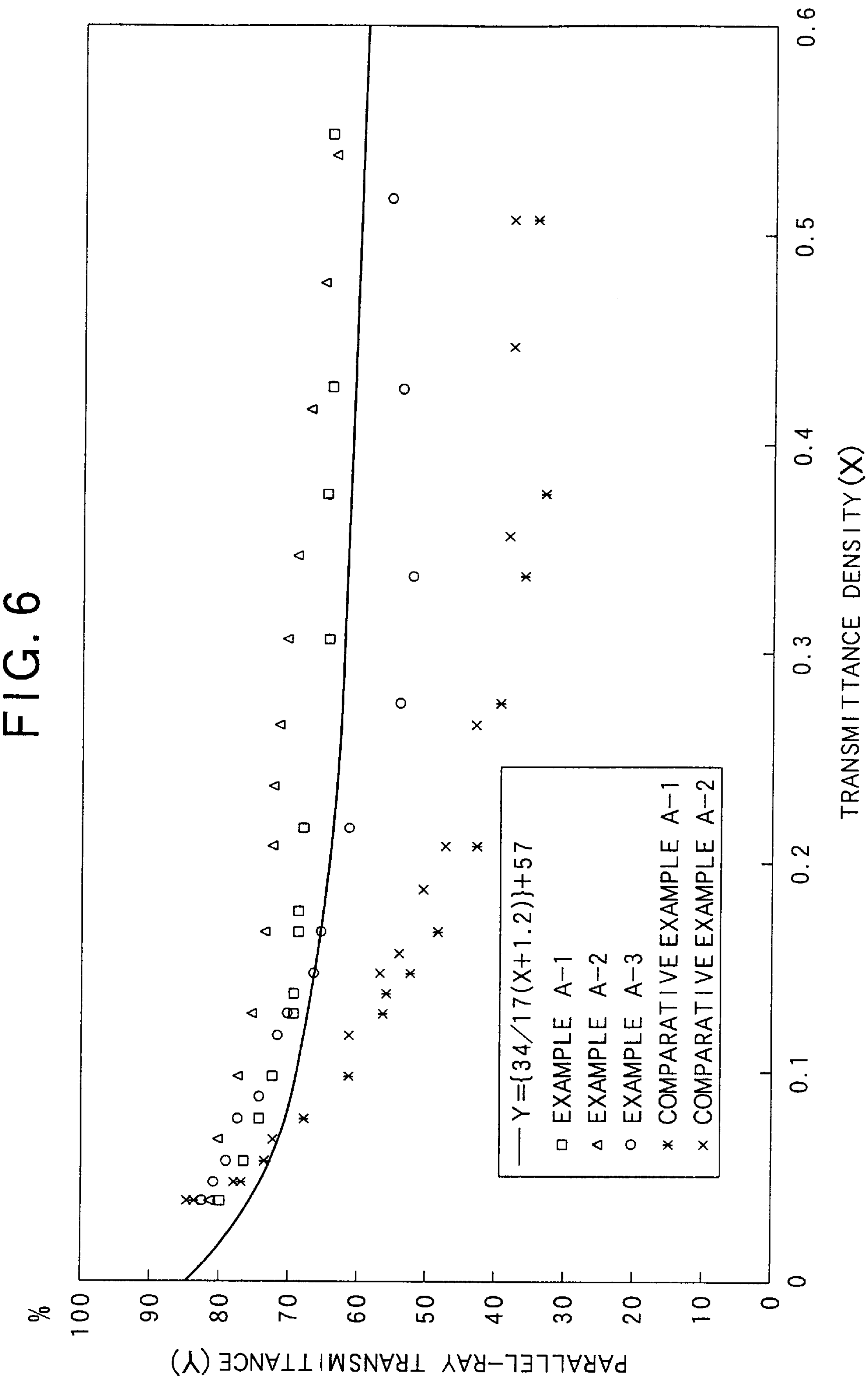
FIG. 6 is a graph obtained by plotting data of the transmittance density and parallel-ray transmittance of each of Examples and Comparative Examples.

The results of measurement are shown in Table 1. A graph obtained by plotting each of measured data is shown in FIG. 6 wherein the abscissa is the transmittance density and the ordinate is the parallel-ray transmittance.

As is shown in the table and the graph, it is found from the results of Examples A-1 to A-3 that the parallel-ray transmittance of the yellow image portion is 50% or more when the transmittance density of the yellow image of the electrophotograph is in a range from 0 to 1.0. Also, it is found from the results of Examples A-1 and A-2 that the parallel-ray transmittance is 55% or more when the transmittance density of the yellow image is in a range from 0 to 0.6.

Moreover, in Examples A-1 and A-2, the relationship: $Y \geqq [34/(X+1.2)]+57$ is satisfied wherein X represents the transmittance density and Y represents the parallel-ray transmittance when the transmittance density of the yellow image is in a range from 0 to 0.6. The curve shown by the solid line in FIG. 6 shows the relation: $Y=[34/(X+1.2)]+57$.

TABLE 1

| Example A-1 | | Example A-2 | | Example A-3 | | Comparative Example A-1 | | Comparative Example A-2 | |
|---|---|---|---|---|---|---|---|---|---|
| Transmittance density x | Parallel-ray transmittance y | Transmittance density x | Parallel-ray transmittance y | Transmittance density x | Parallel-ray transmittance y | Transmittance density x | Parallel-ray transmittance y | Transmittance density x | Parallel-ray transmittance y |
| 0.04 | 82.3 | 0.04 | 83.3 | 0.04 | 83.3 | 0.04 | 83.9 | 0.04 | 84.7 |
| 0.04 | 80.4 | 0.07 | 80.6 | 0.04 | 82.8 | 0.04 | 82.0 | 0.04 | 82.2 |
| 0.05 | 78.1 | 0.10 | 78.0 | 0.05 | 81.3 | 0.05 | 78.0 | 0.05 | 77.4 |
| 0.06 | 76.9 | 0.13 | 76.4 | 0.06 | 79.5 | 0.06 | 73.8 | 0.07 | 72.7 |
| 0.08 | 74.7 | 0.17 | 74.6 | 0.08 | 78.0 | 0.08 | 67.9 | 0.10 | |
| 0.10 | 72.7 | 0.21 | 73.2 | 0.09 | 74.7 | 0.10 | 61.5 | 0.12 | 61.3 |
| 0.13 | 69.4 | 0.24 | 73.0 | 0.12 | 72.1 | 0.13 | 56.4 | 0.15 | 57.0 |
| 0.14 | 69.7 | 0.27 | 72.3 | 0.13 | 70.1 | 0.14 | 55.9 | 0.16 | 54.1 |
| 0.17 | 69.2 | 0.31 | 71.1 | 0.15 | 66.8 | 0.15 | 52.4 | 0.19 | 50.6 |
| 0.18 | 69.2 | 0.35 | 69.9 | 0.17 | 65.7 | 0.17 | 48.2 | 0.21 | 47.4 |
| 0.22 | 68.4 | 0.42 | 68.1 | 0.22 | 61.5 | 0.21 | 42.7 | 0.27 | 42.9 |
| 0.31 | 64.8 | 0.48 | 65.9 | 0.28 | 54.2 | 0.28 | 39.3 | 0.36 | 38.3 |
| 0.38 | 65.3 | 0.54 | 64.4 | 0.34 | 52.6 | 0.34 | 36.0 | 0.45 | 37.9 |
| 0.43 | 64.9 | 0.62 | 63.6 | 0.43 | 54.2 | 0.38 | 33.3 | 0.51 | 38.0 |
| 0.55 | 64.8 | 0.65 | 63.3 | 0.52 | 56.1 | 0.51 | 34.4 | 0.63 | 42.5 |
| 0.62 | 63.0 | 0.77 | 61.1 | 0.63 | 56.6 | 0.65 | 36.6 | 0.76 | 44.0 |
| 0.73 | 60.9 | 0.84 | 57.9 | 0.72 | 53.2 | 0.71 | 36.9 | 0.89 | |
| 0.80 | 59.7 | 0.97 | 55.2 | 0.80 | 52.8 | 0.77 | 37.0 | 0.95 | 43.9 |
| 0.90 | 57.5 | 1.09 | 53.5 | 0.89 | 51.8 | 0.90 | 38.1 | 1.10 | 44.4 |
| 0.95 | 55.3 | 1.20 | | 0.97 | 50.0 | 0.98 | 39.3 | 1.14 | 44.6 |
| 1.04 | 55.1 | 1.39 | 41.1 | 1.03 | 51.2 | 1.12 | 40.6 | 1.41 | 45.4 |

[Image Quality]

Using the aforementioned self-made electrophotographic type printer, a color chart image was formed on each image receiving sheet by using each toner of yellow, magenta, cyan and black. A projected image produced when the image receiving sheet was projected by an OHP was evaluated visually for the occurrence of a graying phenomenon and tone reproducibility.

In each of the OHP image receiving sheets formed with an image in Examples A-1 and A-2, no graying phenomenon is observed over the whole range from the highlight section to the shadow section, superior tone reproducibility is attained and a vivid projected image is obtained. In the OHP image receiving sheet of Example A-3, a graying phenomenon is observed a little in a middle density, but almost superior tone reproducibility is attained and an almost vivid projected image is obtained. On the other hand, in each of the OHP image receiving sheets of Comparative Examples A-1 and A-2, a graying phenomenon is clearly observed over the whole range from the highlight section to the shadow section, the tone reproducibility is inferior and a blurred image is obtained.

Series of Example B (Example B-1)

A receptor layer was formed on one surface of a substrate film shown below by using a coating solution b1 for a receptor layer which had the following composition and a resistance control layer was formed on the receptor layer by using the following coating solution for a resistance control layer to produce an image receiving sheet of Example B-1.

Also, the thickness (dry thickness) of the receptor layer was set to 2 μm and the thickness of the resistance control layer was regulated such that the surface resistance of the image receiving sheet became $1\times10^{10}$ Ω/□.

[Substrate Film]

Polyethylene terephthalate film with 100 μm in thickness (100-T60, manufactured by Toray)

[Coating Solution b1 for receptor Layer]

| | |
|---|---|
| Polyester resin (Epicoat 1004, manufactured by Yuka Shell Epoxy, number average molecular weight: 1,600, softening point: 97° C., Tg: 55° C.) | 30 parts |
| Silica filler (average particle size: 5 μm) | 0.5 parts |
| Methyl ethyl ketone | 35 parts |
| Toluene | 35 parts |

[Coating Solution for Resistance Control Layer]

| | |
|---|---|
| Cation modified quaternary ammonium salt | 1 part |
| Isopropyl alcohol | 100 parts |

(Example B-2)

A receptor layer was formed on one surface of the substrate film used in Example B-1 by using the following coating solution b2 for a receptor layer and a resistance control layer was formed on the receptor layer by using the coating solution for a resistance control layer which was used in Example B-1 to produce an image receiving sheet of Example B-2.

Also, the thickness (dry thickness) of the receptor layer was set to 2 μm and the thickness of the resistance control layer was regulated such that the surface resistance of the image receiving sheet became $1\times10^{10}$ Ω/□.

[Coating Solution b2 for Receptor Layer]

| | |
|---|---|
| Polyester resin (RV220, manufactured by Toyobo, number average molecular weight: 4,000, Tg: 53° C.) | 30 parts |
| Silica filler (average particle size: 5 μm) | 0.5 parts |
| Methyl ethyl ketone | 35 parts |
| Toluene | 35 parts |

(Example B-3)

A receptor layer was formed on one surf ace of the substrate film used in Example B-1 by using the following coating solution b3 for a receptor layer and a resistance control layer was formed on the receptor layer by using the coating solution for a resistance control layer which was used in Example B-1 to produce an image receiving sheet of Example B-3.

Also, the thickness (dry thickness) of the receptor layer was set to 2 μm and the thickness of the resistance control layer was regulated such that the surf ace resistance of the image receiving sheet became $1\times10^{10}$ Ω/□.

[Coating Solution b3 for Receptor Layer]

| | |
|---|---|
| Polyester resin (HP320, manufactured by The Nippon Synthetic Chemical Industry, number average molecular weight: 3,300, Tg: 63° C.) | 30 parts |
| Silica filler (average particle size: 5 μm) | 0.5 parts |
| Methyl ethyl ketone | 35 parts |
| Toluene | 35 parts |

Comparative Example B-1

A receptor layer was formed on one surface of the substrate film used in Example B-1 by using the following coating solution b4 for a receptor layer and a resistance control layer was formed on the receptor layer by using the coating solution for a resistance control layer which was used in Example B-1 to produce an image receiving sheet of Comparative Example B-1.

Also, the thickness (dry thickness) of the receptor layer was set to 2 μm and the thickness of the resistance control layer was regulated such that the surface resistance of the image receiving sheet became $1\times10^{10}$ Ω/□.

[Coating Solution b4 for Receptor Layer]

| | |
|---|---|
| Polyester resin (HP313, manufactured by the Nippon Synthetic Chemical Industry, number average molecular weight: 8,000, Tg: 64° C.) | 30 parts |
| Silica filler (average particle size: 5 μm) | 0.5 parts |
| Methyl ethyl ketone | 35 parts |
| Toluene | 35 parts |

(Comparative Example B-2)

A receptor layer was formed on one surface of the substrate film used in Example B-1 by using the following coating solution b5 for a receptor layer and a resistance control layer was formed on the receptor layer by using the coating solution for a resistance control layer which was used in Example B-1 to produce an image receiving sheet of Comparative Example B-2.

Also, the thickness (dry thickness) of the receptor layer was set to 2 μm and the thickness of the resistance control layer was regulated such that the surface resistance of the image receiving sheet became $1\times10^{10}$ Ω/□.

[Coating Solution b5 for Receptor Layer]

| | |
|---|---|
| Polyester resin (RV200, manufactured by Toyobo, number average molecular weight: 17,000, sofetning point: 163° C., Tg: 53° C.) | 30 parts |
| Silica filler (average particle size: 5 μm) | 0.5 parts |
| Methyl ethyl ketone | 35 parts |
| Toluene | 35 parts |

Using the image receiving sheets prepared in the above Examples and Comparative Examples, the haze value and transmittance density of a yellow image formed by electrophotography were measured using the following method and also the image quality was evaluated.

In a method of measuring the surface resistance of each of image receiving sheets prepared in Examples and Comparative Examples, a voltage of 500 V was applied to the surface of each image receiving sheet under a circumstance of 23° C. and 50% RH and the surface resistance was measured by using a surface resistance measuring meter (Hiesta, manufactured by Mitsubishi Petrochemical) at 10 seconds after starting of the voltage-application.

[Haze Value and Transmittance Density]

Using a self-made electrophotographic type printer (softening point of a toner to be used: 100° C., surface temperature of a fixing roll: 180° C.), only a yellow image formed in the following condition was recorded in the image receiving surface of each image receiving sheet obtained in Examples and Comparative Examples. The recorded printed product was measured for the haze value according to a method prescribed in JIS K 7105 by using a Haze meter manufactured by Nippon Denshoku Kogyo and for the transmittance density by using the status A blue filter prescribed in ISO 5-3 and a transmittance densitometer TR-924 manufactured by Macbeth.

Condition of a yellow image: an image produced either in the same condition as the yellow gradation pattern prescribed in the Test Chart No. 5-1 of Electrophotographic Association or using data obtained in the following conditions: 256 gradations, R=225, G=225 and B=X ($0\leqq X\leqq 225$), was used.

Figure 7:
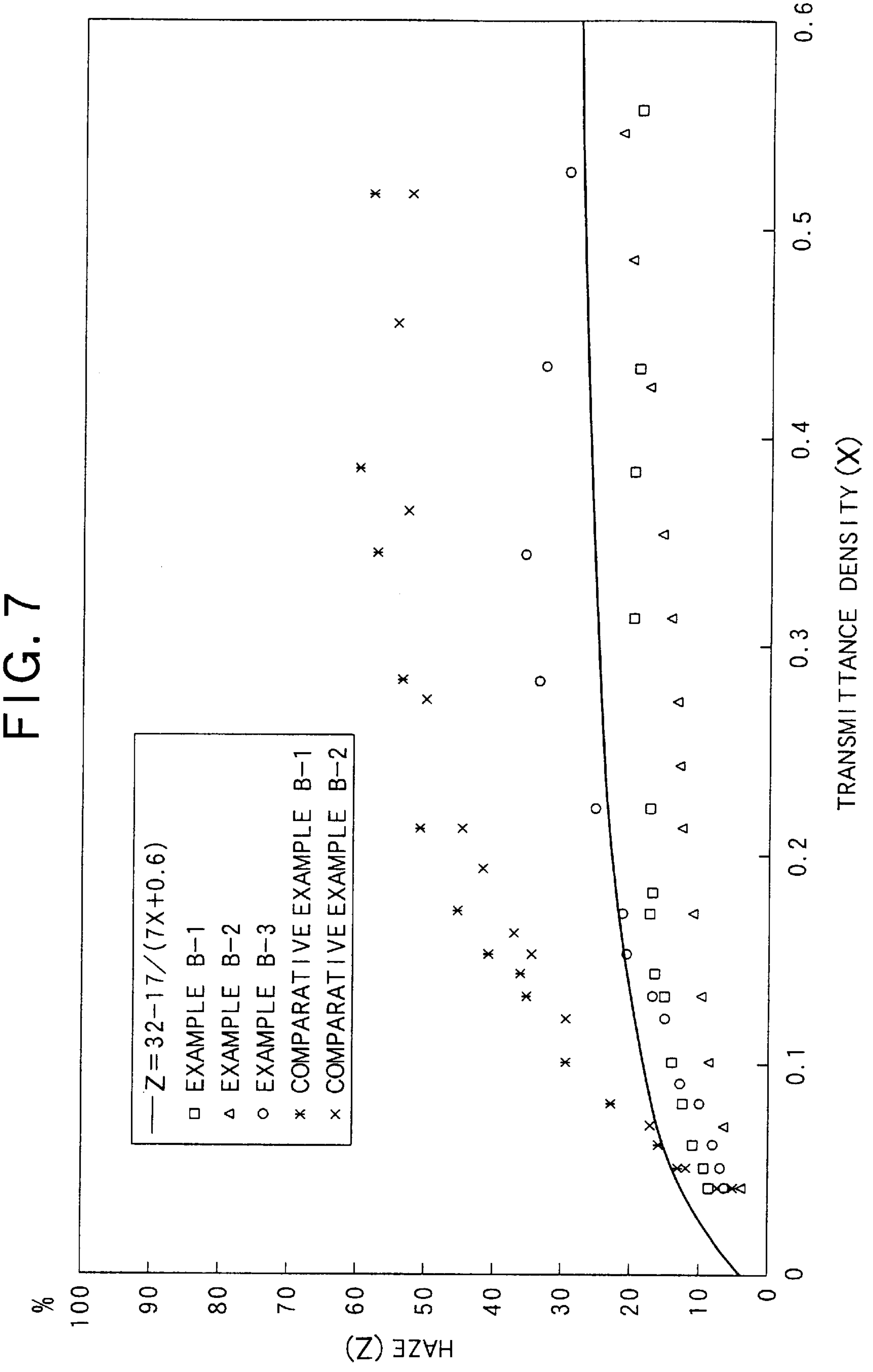
FIG. 7 is a graph obtained by plotting data of the transmittance density and haze value of each of Examples and Comparative Examples.

The results of measurement for the above haze value and transmittance density are shown in Table 2. Agraph obtained by plotting each of measured data is shown in FIG. 7 wherein the abscissa is the transmittance density and the ordinate is the haze value.

As is shown in the table and the graph, it is found from the results of Examples B-1 to B-3 that the haze value is 40% or less when the transmittance density of the yellow image of the electrophotograph is in a range from 0 to 1.0. Also, it is found from the results of Examples B-1 and B-2 that the haze value is 30% or less when the transmittance density of the yellow image is in a range from 0 to 0.6.

Moreover, in Examples B-1 and B-2, the relationship: $Z \leqq 32-17/(7X+0.6)$ is satisfied wherein X represents the transmittance density and Z represents the haze value when the transmittance density of the yellow image is in a range from 0 to 0.6. The curve shown by the solid line in FIG. 7 shows the relation: $Z=32-17/(7X+0.6)$.

TABLE 2

| Example B-1 | | Example B-2 | | Example B-3 | | Comparative Example B-1 | | Comparative Example B-2 | |
|---|---|---|---|---|---|---|---|---|---|
| Trans-mittance density x | Haze (haze value) z | Trans-mittance density x | Haze (haze value) z | Trans-mittance density x | Haze (haze value) z | Trans-mittance density x | Haze (haze value) z | Trans-mittance density x | Haze (haze value) y |
| 0.04 | 6.3 | 0.04 | 3.5 | 0.04 | 5.5 | 0.04 | 5.5 | 0.04 | 4.7 |
| 0.04 | 7.4 | 0.07 | 6.4 | 0.04 | 5.6 | 0.04 | 7.2 | 0.04 | 7.2 |
| 0.05 | 9.3 | 0.10 | 8.6 | 0.05 | 6.6 | 0.05 | 11.7 | 0.05 | 12.8 |
| 0.06 | 10.6 | 0.13 | 9.9 | 0.06 | 8.0 | 0.06 | 16.4 | 0.07 | 17.5 |
| 0.08 | 12.8 | 0.17 | 11.6 | 0.08 | 10.0 | 0.08 | 23.3 | 0.10 | |
| 0.10 | 14.1 | 0.21 | 12.9 | 0.09 | 12.9 | 0.10 | 30.2 | 0.12 | 30.5 |
| 0.13 | 15.4 | 0.24 | 13.3 | 0.12 | 15.2 | 0.13 | 36.1 | 0.15 | 35.3 |
| 0.14 | 16.8 | 0.27 | 13.8 | 0.13 | 17.1 | 0.14 | 36.9 | 0.16 | 37.8 |
| 0.17 | 17.7 | 0.31 | 14.8 | 0.15 | 21.3 | 0.15 | 41.5 | 0.19 | 42.5 |
| 0.18 | 17.2 | 0.35 | 16.1 | 0.17 | 21.9 | 0.17 | 46.3 | 0.21 | 45.7 |
| 0.22 | 17.6 | 0.42 | 18.5 | 0.22 | 26.1 | 0.21 | 52.1 | 0.27 | 51.2 |
| 0.31 | 20.4 | 0.48 | 20.7 | 0.28 | 34.3 | 0.28 | 54.9 | 0.36 | 54.2 |
| 0.38 | 20.5 | 0.54 | 22.5 | 0.34 | 36.6 | 0.34 | 59 | 0.45 | 55.9 |
| 0.43 | 19.9 | 0.62 | 22.9 | 0.43 | 33.9 | 0.38 | 61.5 | 0.51 | 54.0 |
| 0.55 | 19.5 | 0.65 | 24.0 | 0.52 | 30.6 | 0.51 | 59.7 | 0.63 | 48.2 |
| 0.62 | 20.7 | 0.77 | 26.2 | 0.63 | 29.3 | 0.65 | 55.1 | 0.76 | 44.3 |
| 0.73 | 23.5 | 0.84 | 30.0 | 0.72 | 33.2 | 0.71 | 55.3 | 0.89 | |
| 0.80 | 24.1 | 0.97 | 33.0 | 0.80 | 33.0 | 0.77 | 54.3 | 0.95 | 43.5 |
| 0.90 | 26.6 | 1.09 | 35.3 | 0.89 | 33.9 | 0.90 | 52.5 | 1.10 | 42.9 |
| 0.95 | 28.0 | 1.20 | | 0.97 | 34.9 | 0.98 | 49.7 | 1.14 | 41.7 |
| 1.04 | 29.0 | 1.39 | 41.1 | 1.03 | 33.9 | 1.12 | 47.9 | 1.41 | 40.0 |

[Image Quality]

Using the aforementioned self-made electrophotographic type printer, a color chart image was formed on each image receiving sheet by using each toner of yellow, magenta, cyan and black. A projected image produced when the image receiving sheet was projected by an OHP was evaluated visually for the occurrence of a graying phenomenon and tone reproducibility.

In each of the OHP image receiving sheets formed with an image in Examples B-1 and B-2, no graying phenomenon is observed over the whole range from the highlight section to the shadow section, superior tone reproducibility is attained and a vivid projected image is obtained. In the OHP image receiving sheets of Example B-3, a graying phenomenon is observed a little in a middle density, but almost superior tone reproducibility is attained and an almost vivid projected image is obtained. On the other hand, in each of the OHP image receiving sheets of Comparative Examples B-1 and B-2, a graying phenomenon is clearly observed over the whole range from the highlight section to the shadow section, the tone reproducibility is inferior and a blurred image is obtained.

What is claimed is:

1. An image receiving sheet printable by electrophotography and applicable to an overhead projector (OHP), the image receiving sheet being capable of forming a yellow image providing a parallel-ray transmittance of 50% or more when the transmittance density is in a range from 0 to 1.0 by electrophotography.

2. An image receiving sheet according to claim 1, wherein the image receiving sheet is capable of forming a yellow image providing a parallel-ray transmittance of 55% or more when the transmittance density is in a range from 0 to 0.6 by electrophotography.

3. An image receiving sheet according to claim 1, wherein a receptor layer printable by electrophotography is formed on at least one side of a substrate film.

4. An image receiving sheet printable by electrophotography and applicable to an overhead projector (OHP), wherein the following expression 1 is established between the transmittance density and the parallel-ray transmittance when the transmittance density is in a range from 0 to 0.6;

Expression 1

$$Y \geqq \{34/(X+1.2)\}+57$$

where X represents the transmittance density and Y represents the parallel-ray transmittance, provided that $0 \leqq X \leqq 0.6$.

5. An image receiving sheet according to claim 4, wherein a receptor layer printable by electrophotography is formed on at least one side of a substrate film.

6. An image receiving sheet printable by electrophotography and applicable to an overhead projector (OHP), the image receiving sheet being capable of forming a yellow image providing a haze value of 40% or less when the transmittance density is in a range from 0 to 1.0 by electrophotography.

7. An image receiving sheet according to claim 6, wherein the image receiving sheet is capable of forming a yellow image providing a haze value of 30% or less when the transmittance density is in a range from 0 to 0.6 by electrophotography.

8. An image receiving sheet according to claim 7, wherein a receptor layer printable by electrophotography is formed on at least one side of a substrate film.

9. An image receiving sheet printable by electrophotography and applicable to an overhead projector (OHP), wherein the following expression 3 is established between the transmittance density and the haze value when the transmittance density is in a range from 0 to 0.6;

Expression 3

$$Z \leqq 32-17/(7X+0.6)$$

where X represents the transmittance density and Z represents the haze value, provided that $0 \leqq X \leqq 0.6$.

10. An image receiving sheet according to claim 9, wherein a receptor layer printable by electrophotography is formed on at least one side of a substrate film.

11. A process for forming an OHP image comprising steps of:

providing an image receiving sheet applicable to an overhead projector (OHP), the image receiving sheet being capable of forming a yellow image providing a parallel-ray transmittance of 50% or more when the transmittance density is in a range from 0 to 1.0 by electrophotography; and printing an image on the image receiving sheet by electrophotography.

12. A process for forming an OHP image according to claim 11, wherein the image receiving sheet to be provided is capable of forming a yellow image providing a parallel-ray transmittance of 55% or more when the transmittance density is in a range from 0 to 0.6 by electrophotography.

13. A process for forming an OHP image comprising steps of:

providing an image receiving sheet applicable to an overhead projector (OHP), wherein the following expression 1 is established between the transmittance density and the parallel-ray transmittance when the transmittance density is in a range from 0 to 0.6;

Expression 1

$$Y \leqq \{34/(X+1.2)\}+57$$

where X represents the transmittance density and Y represents the parallel-ray transmittance, provided that $0 \leqq X \leqq 0.6$; and printing an image on the image receiving sheet by electrophotography.

14. A process for forming an OHP image comprising steps of:

providing an image receiving sheet applicable to an overhead projector (OHP), the image receiving sheet being capable of forming a yellow image providing a haze value of 40% or less when the transmittance density is in a range from 0 to 1.0 by electrophotography; and printing an image on the image receiving sheet by electrophotography.

15. A process for forming an OHP image according to claim 14, wherein the image receiving sheet to be provided is capable of forming a yellow image providing a haze value of 30% or less when the transmittance density is in a range from 0 to 0.6 by electrophotography.

16. A process for forming an OHP image comprising steps of:

providing an image receiving sheet applicable to an overhead projector (OHP), wherein the following expression 3 is established between the transmittance density and the haze value when the transmittance density is in a range from 0 to 0.6;

Expression 3

$$Z \leqq 32-17/(7X+0.6)$$

where X represents the transmittance density and Z represents the haze value, provided that $0 \leqq X \leqq 0.6$; and printing an image on the image receiving sheet by electrophotography.

* * * * *